United States Patent Office 3,410,399
Patented Nov. 12, 1968

3,410,399
METHOD FOR DISPERSING CLAY
Joseph L. Hunter, Metuchen, N.J., assignor, by mesne assignments, to Engelhard Minerals & Chemicals Corporation, Edison, N.J., a corporation of Delaware
No Drawing. Filed Dec. 14, 1966, Ser. No. 601,559
5 Claims. (Cl. 209—5)

ABSTRACT OF THE DISCLOSURE

The selective froth flotation of colored impurities from discolored clays to produce high brightness clay pigments requires the use of the clay in the form of a well-dispersed aqueous pulp in which the colored impurities are separated from the clay particles originally associated with the impurities. In order to improve the response of stockpiled (aged) gray clay crudes to flotation beneficiation, the dispersion step is carried out with specific reagents, namely a combination of sodium hydroxide, sodium carbonate and sodium silicate.

Background of invention

The dispersion of clay for flotation purposes presents problems not present when clay is dispersed for other purposes (e.g., the dispersion of clay in the "makedown" for preparation of coating colors). When dispersing a kaolin crude for flotation beneficiation, the dispersant must be one which will not interfere with the subsequent flotation operation. Since materials that are effective in dispersing (deflocculating) clays may also tend to activate or depress the clay or clay impurities, the dispersion of clay for flotation purposes is very complex. For example, kaolins can be dispersed for use in the preparation of high solids coating colors by the simple expedient of using a small amount of sodium hexametaphosphate or tetrasodium pyrophosphate with the clay. However, clay pulps do not respond well to selective flotation of impurities when either of these dispersants is used because the impurities as well as the clay tend to be depressed. With soda ash as the sole dispersant, the clay as well as the impurities tends to float and there is no selectivity. On the other hand, pulps of some clays, exemplified by certain "white" or "soft" Georgia crudes, respond well to selective flotation of colored impurities when an alkaline sodium silicate is employed as the dispersant.

However, in the case of the "gray" or "hard" crudes with which the present invention is concerned, sodium silicate does not suffice as the sole dispersant for use in preparing the crude for froth flotation beneficiation. The use of soda ash with the sodium silicate is much more satisfactory with these crudes. Employing this dispersant combination, bright white clay products have been produced which meet minimum brightness specifications of 90% (TAPPI Standard T646-M-54).

The mechanism by which the soda ash improves flotation with a sodium silicate dispersant is not known. It is possible that the soda ash eliminates certain ions, such as calcium ions, which might impair dispersion. It has also been postulated that the carbonate ion is adsorbed on the colored impurities, preventing adsorption of silicate with resulting dispersion of the impurities.

It has been recently discovered, however, that 90%-plus brightness clay cannot be produced when gray crudes are aged after they have been mined. This was surprising since the crudes are over fifty million years old and a month or two of storage in a stockpile would not be expected to have a significant effect on crude. It was also surprising since the more familiar Georgia kaolin crudes which are presently wet-processed to produce quality clay pigments ("white" or "soft" crudes) do not deteriorate with aging. When beneficiated by flotation and chemical bleaching, the nature of the products is the same, as far as can be ascertained, whether fresh or aged white crudes are used.

Still another difficulty is encountered in dispersing gray crudes with a combination of soda ash and sodium silicate. After the crudes are dispersed and while the clay is in the aqueous medium, the pulps tend to thicken and flocculate. Satisfactory flotation is not realized even when the aged pulps are redispersed by further addition of soda ash and/or sodium silicate.

Summary of the invention

An object of this invention is the provision of an improved method for dispersing (deflocculating) gray clay, especially stockpiled (aged) gray clay, before the clay is subjected to flotation beneficiation.

Another object is to provide dispersed slips of gray kaolin which contain dispersants suitable for flotation purposes and which have a reduced tendency to thicken when stored before treatment in flotation cells.

Stated briefly, in accordance with this invention, stockpiled gray kaolin clays are dispersed for selective flotation of colored impurities with a combination of basic hydroxide, preferably sodium hydroxide, sodium carbonate and sodium silicate, the basic hydroxide and sodium carbonate being added to the pulp before the sodium silicate is added and in amount sufficient to bring the pH of the pulp to a value within the range of 7 to 9.

The pulp of gray clay, thus dispersed, is subjected to froth flotation in an alkaline circuit in the presence of reagents selective to the flotation of titaniferous impurities in the gray clay, substantially as described in U.S. 2,990,958 to E. W. Greene et al., to which reference is made herein. The beneficiated clay, which reports in the flotation tailings, is then bleached chemically, preferably using an oxidizing agent, especially potassium permanganate, and thereafter a reducing bleach reagent, such as zinc hydrosulfite. The use of this type of bleach treatment is described in Serial No. 330,634, now Patent No. 3,353,-668, filed Dec. 13, 1963, by James B. Duke, to which reference is also made herein.

By practice of the invention, aged hard crudes will respond substantially as well as fresh crudes to flotation beneficiation. The percent titania removed in the froth of aged crudes corresponds to the quantity of titania removed from fresher crudes. The bleached clay products from the aged crudes are also comparable in brightness to products from recently mined crudes. In some cases, unusually high brightness is achieved. Thus, even when aged crudes are processed or when the slips of crude are aged, high brightness clay can be produced by flotation and bleaching. The resulting bleached clay has a desirable blue-white color cast presently unobtainable when the best white domestic crudes are beneficiated.

In effect, by practice of this invention, gray clay crudes can be mined and stored before they are beneficiated by flotation without detriment to the flotation operation.

As a further benefit, clay pulps which are dispersed in accordance with this invention are less prone to flocculate after the dispersed pulps are aged. The pulps can therefore be stored for longer periods of time before they are conditioned for flotation without sacrificing the effectiveness of the flotation step.

Description of the invention

The term "gray" clay, as used herein, refers to a kaolin clay having a distinctive gray cast or hue. Frequently these clays are characterized by being composed of a much larger percentage of submicron size particles than the domestic white crudes. Extensive deposits of finely divided gray clays are located near McIntyre, Ga., in the vicinity of the deposits of white crudes which are presently mined and wet-processed to produce quality coating grade kaolin clay products. The McIntyre gray clays consist largely of kaolinite (a distinct hydrated aluminum silicate mineral) and contain small amounts of mica. Generally, these clays contain somewhat less titania (yellow form) than the white crudes. However, the Georgia gray clays contain much more iron impurity. The high iron content does not, however, explain the unique gray color cast of the crudes. After flotation beneficiation and bleaching, the refined gray clays are whiter and brighter than refined white crudes in spite of the fact that the beneficiated gray clays have a much higher iron content.

This invention is applicable to the treatment of gray crudes that have aged in open or closed stockpiles for times ranging from a week to a year or more after they have been mined. Generally, the deterioration of the clay as flotation feed reaches a maximum after the mined clay has aged a few months in the presence of air. Clay that has been dry mined and stockpiled for two or three months in open piles or sheds is as troublesome as gray crude that has aged a longer period of time. However, gray clay crudes that have been stockpiled for times as short as a few weeks may present serious problems using prior dispersion systems.

In putting the present invention into practice, the raw ground clay is blunged in water at any concentration suitable for handling purposes. The use of 20% to 30% solids is suggested although the invention is not limited thereto. The pulp will have a pH within the range of about 3 to 5, depending on the particular crude and the extent to which the crude has been aged in the presence of air. A basic hydroxide, preferably sodium hydroxide, is added until the pH is within the range of 7 to 9, preferably 8.0 to 8.5. The sodium hydroxide is preferably added as an aqueous solution to prevent the formation of "fish eyes" which might occur with addition of dry caustic. Alternatively, the clay can be blunged in water containing all or a part of the basic hydroxide. Other basic hydroxides include potassium, lithium, ammonium, barium and magnesium hydroxides.

After the pulp is agitated with the basic hydroxide, sodium carbonate is added, preferably as an aqueous solution. The optimum quantity of soda ash varies with crudes of different origin and, to some extent, with the quantity of sodium silicate used. In order to determine an optimum quantity of soda ash, portions of the alkalized pulp can be individually treated with quantities of soda ash ranging from 2 to 8 lbs./ton of clay, usually 3 to 5 lbs./ton. For example, increments of 1 lb./ton can be used. Sodium silicate is then added to each soda ash-treated pulp using a constant quantity of sodium silicate (preferably within the range of ¼ to 3 lbs./ton anhydrous sodium basis). The quantity of sodium silicate employed should be limited since excess silicate tends to depress colored impurities in the subsequent froth flotation step. The sodium silicate employed is a water-soluble alkaline silicate, exemplified by "O" brand or "N" brand. The individual pulps are then reagentized for flotation and floated. The tailings are thickened and bleached by adding an oxidizing reagent and then a reducing agent. Bleached brightness of clay samples are compared. The quantity of soda ash in the sample having optimum brightness is selected for use with the particular crude that is used.

It is preferable to use the dispersed slips shortly after they are prepared in order to minimize the possibility of flocculation taking place. However, the presence of alkali hydroxide additive tends to stabilize the dispersion and retard flocculation. If necessary, small additions of sodium silicate can be made to aged pulps before flotation is carried out.

The invention and some of its features and advantages are illustrated by the following example.

The clay crude employed in the tests was a sedimentary gray crude ("Mattie Ivey") obtained from a mine near McIntyre, Ga. Geological tests indicated that the crudes had been laid down in the area about sixty million years ago at the end of the Cretaceous period.

In pilot plant-scale flotation tests with this type of clay when operating outside the scope of the invention, the gray clay crude was blunged in water at about 30% solids without a dispersant. The pulps were then dispersed. With fresh crude, the pulps had a pH of about 5.5 and were dispersed by adding dry soda ash in amount of 4 lbs./ton dry clay and 4 lbs. "O" brand sodium silicate per ton of clay ("O" brand contains 38% solid). The dispersed clay slip was screened to eliminate oversize and the screened slip was fractionated by centrifugal sedimentation to obtain a fine size cut calculated (Stokes' law) to contain at least 92% by weight of minus 2.0 micron particles. Brightness of the fine size cut was about 79%.

The dispersed slip of gray clay was conditioned for flotation by adding the following reagents: calcium carbonate classified to a mean particle size of about 5 microns ("Drikalite") in amount of 30% of the clay weight; ammonium sulfate (as a 5% aqueous solution) in amount of 6.0 lbs./ton of clay; an aqueous emulsion containing 4.0 lbs. ammonium hydroxide, 6.2 lbs. of distilled refined tall oil containing about 70% fatty acids and 25% rosin acids, and 6.2 lbs./ton of a solution of neutral petroleum sulfonate in an equal weight of mineral oil ("Calcium Petronate"); and 8.0 lbs./ton of lubricating oil (Eureka M). (All reagents reported as lbs./ton of dry clay in the slip.) The pulp, which was at 20% clay solids, was conditioned for 17 minutes in a flotation cell. The pH of the conditioned pulp was 8.9.

The pulp was subjected to froth flotation, removing a froth product for 10 minutes. The froth was composed predominantly of the calcium carbonate flotation reagent intimately associated with impurities, especially yellowish titaniferous matter, originally present in the gray clay. The pulp remaining in the flotation machine was discharged and the froth was repulped in the flotation machine and floated for 10 minutes. This procedure was repeated twice. The machine discharge products (tailings) were combined. This material contained the flotation beneficiated clay. This slip of combined machine discharge products was flocced by addition of sulfuric acid to a pH of 2.5. The flocced slip was thickened to about 20% solids and potassium permanganate was added as a 1% aqueous solution in amount to provide 5 lbs. to 10 lbs. $KMnO_4$/ton clay. The slip was mildly agitated at ambient temperature for about 48 hours, resulting in the formation of a deep brown system. Sulfur dioxide gas was bubbled into the slip, resulting in the decolorization of the reduced brown manganese compound. Zinc hydrosulfite bleaching reagent was added to the flocced clay and the bleached clay was filtered, washed and dried.

A lot of the gray crude was dry mined, crushed and stored in the open. Pilot plant flotation work was started two weeks after the clay was mined. The process worked satisfactorily, producing products with 92 plus bleached brightness (TAPPI Standards T646–M–54). Within a month after mining, difficulty was encountered in dispersing the clay, and a decrease in bleached and unbleached clay brightness was observed. Although various dispersion procedures and quantities were tried, and increased quantities of bleaching reagents were used, 90%-plus bleached brightness products could not be obtained. Titania ($TiO_2$) analyses of the machine discharge products indicated that the flotation operation was inefficient.

In a pilot plant operation of the process of the invention, a portion of the "Mattie Ivey" crude that could not be floated satisfactorily after aging for one month was employed after it had been stored in the stockpile for four months.

The clay crude, which had a pH of about 3.4, was blunged in the primary blungers of the pilot plant in sodium hydroxide solution (3 lbs./ton of clay). The pH was 8.0 to 8.5. Sodium carbonate was added as a dry powder in amount of 4.0 lbs./ton, bringing the pH to 9.3. Sodium silicate ("O" brand) was added in amount of 2.0 lbs./ton. pH was 9.4. The pulp was thoroughly agitated and the blunger covered and aged overnight. The next morning additional "O" brand sodium silicate was added in amount of ½ lb./ton. The quantities of sodium hydroxide and sodium silicate used in the pilot plant operation, as described above, had been predetermined by carrying out bench-scale tests with the crude. In these tests, pH was adjusted by adding sodium hydroxide to pH values of 8.0 to 8.5 and adding 4 lbs./ton sodium carbonate. The quantity of sodium carbonate had been preselected on the basis of previous flotation tests with this particular crude. "O" brand sodium silicate was added to separate the pulp after the soda ash had been incorporated, using 2 lbs./ton "O" brand in one test and 4 lbs./ton "O" brand in another test. The pulps were then flotation beneficiated, the flotation tailings recovered, flocced and bleached in bench tests corresponding to pilot plant procedures. Using 3 lbs./ton sodium silicate, unbleached brightness was 84.2% and bleached brightness was 90.2%. Using 2 lbs./ton sodium silicate, unbleached brightness was 85.2% and bleached brightness was 91.6%.

The dispersed pulp was then screened, fractionated and floated in the pilot plant. The combined machine discharge products were bleached with the permanganate and hydrosulfite, as described above.

The combined machine discharge had an excellent brightness of 86.6%, representing a 7.6% increase in brightness as a result of the flotation step per se. In comparison, the increase in brightness was only 3 to 5% in the large number of tests in which various combinations of soda ash and sodium silicate had been used.

After bleaching, the machine discharge had an excellent bleached brightness of 91.1%. This value was well above the brightness specification of 90%. Thus, in spite of the fact that the gray crude, aged only one month, could not be wet processed to provide a 90%-plus brightness clay, using prior dispersion methods, the same crude, after being stored for a much longer period and dispersed according to the present invention, yielded a beneficiated product in excess of the brightness specifications.

I claim:

1. In the treatment of discolored gray kaolin clay crude which has been aged after having been mined, said treatment comprising a flotation beneficiation step wherein an aqueous pulp of said clay is dispersed with sodium silicate and the dispersed pulp is subjected to froth flotation in an alkaline circuit in the presence of anionic reagents selective to the flotation of colored impurities in said clay, removing a froth which is a concentrate of colored impurities, and recovering flotation tailings containing clay of increased purity, the improvement which comprises:

dispersing said pulp of aged gray kaolin clay by incorporation therewith of a combination of basic hydroxide, sodium carbonate, and sodium silicate, said basic hydroxide and said sodium carbonate each being separately incorporated into said pulp with agitation after addition of each of said respected agents and before addition of said sodium silicate and in amount such that said pulp has a pH within the range of 7 to 9 before sodium silicate is incorporated.

2. The method of claim 1 wherein said basic hydroxide is sodium hydroxide.

3. The method of claim 2 wherein said sodium hydroxide is incorporated into said pulp in amount sufficient to adjust the pH of the pulp to a value within the range of 8 to 9 before soda ash is added.

4. The method of claim 3 wherein said sodium carbonate is added in amount within the range of 2 to 6 lbs./ton of clay and said sodium silicate is added in amount within the range of ¼ to 3 lbs., anhydrous sodium silicate basis, per ton of clay.

5. The method of claim 3 wherein said amount of sodium carbonate is determined by adding increasing amounts of sodium carbonate within said range to separate portions of said pulp containing sodium hydroxide additive, to each pulp adding an amount of sodium silicate within said range, measuring the brightness of said dispersed clay, subjecting each of said pulps to said flotation treatment, measuring the brightness of the clay in each of the resulting flotation tailings, and selecting as the amount of sodium carbonate to be used the amount which has resulted in the greatest increase in brightness between the clay before and after said flotation treatment.

No references cited.

HARRY B. THORNTON, *Primary Examiner.*

R. HALPER, *Assistant Examiner.*